(12) United States Patent
Dong et al.

(10) Patent No.: US 9,420,237 B2
(45) Date of Patent: Aug. 16, 2016

(54) INSIGHT-DRIVEN AUGMENTED AUTO-COORDINATION OF MULTIPLE VIDEO STREAMS FOR CENTRALIZED PROCESSORS

(71) Applicant: GLOBALFOUNDRIES INC., Grand Cayman (KY)

(72) Inventors: Wei Shan Dong, Beijing (CN); Ning Duan, Beijing (CN); Arun Hampapur, Norwalk, CT (US); Ke Hu, Beijing (CN); Hongfei Li, Briarcliff Manor, NY (US); Li Li, Beijing (CN); Wei Sun, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 411 days.

(21) Appl. No.: 13/938,200

(22) Filed: Jul. 9, 2013

(65) Prior Publication Data

US 2015/0015717 A1 Jan. 15, 2015

(51) Int. Cl.
 *H04N 7/18* (2006.01)
(52) U.S. Cl.
 CPC ..................................... *H04N 7/181* (2013.01)
(58) Field of Classification Search
 CPC ........................................................ H04N 7/181
 USPC .......................................... 348/159, 153, 143
 See application file for complete search history.

(56) References Cited

U.S. PATENT DOCUMENTS

| | | | |
|---|---|---|---|
| 6,128,649 A | 10/2000 | Smith et al. | |
| 7,065,250 B1 * | 6/2006 | Lennon | G06K 9/6892 382/224 |
| 7,143,352 B2 | 11/2006 | Divakaran et al. | |
| 7,646,895 B2 | 1/2010 | Haupt et al. | |
| 7,856,370 B2 | 12/2010 | Katta et al. | |
| 8,077,178 B2 | 12/2011 | Uthe | |
| 2004/0169654 A1 | 9/2004 | Walker et al. | |
| 2007/0033289 A1 * | 2/2007 | Nuyttens | H04N 7/181 709/230 |
| 2007/0052807 A1 * | 3/2007 | Zhou | H04N 7/181 348/159 |
| 2008/0184245 A1 | 7/2008 | St-Jean | |
| 2009/0021583 A1 * | 1/2009 | Salgar | H04N 7/181 348/159 |
| 2009/0113323 A1 | 4/2009 | Zhao et al. | |

(Continued)

OTHER PUBLICATIONS

Rishabh et al., Interactive semantic camera coverage determination using 3D floorplans, 2010 IEEE Computer Society Conference on Computer Vision and Pattern Recognition Workshops (CVPRW), Jun. 13-18, 2010, pp. 33-40.*

(Continued)

*Primary Examiner* — Jay Patel
*Assistant Examiner* — Francis G Geroleo
(74) *Attorney, Agent, or Firm* — Michael LeStrange; Andrew M. Calderon; Roberts Mlotkowski Safran Cole & Calderon P.C.

(57) ABSTRACT

A method of providing video feeds from a plurality of cameras to a plurality of screens including determining a plurality of constraints on a centralized processor processing the video feeds, determining a camera semantic classification for each of the plurality of cameras, determining historical events captured by each of the plurality of cameras, and providing at least one video feed to at least one of the screens according to the plurality of constraints on the centralized processor, the camera semantic classifications and the historical events.

16 Claims, 10 Drawing Sheets

(56) References Cited

U.S. PATENT DOCUMENTS

| | | | |
|---|---|---|---|
| 2010/0124378 A1* | 5/2010 | Das | G06F 17/30247 382/225 |
| 2010/0306709 A1 | 12/2010 | Lynch et al. | |
| 2011/0261202 A1 | 10/2011 | Goldstein | |
| 2011/0283240 A1 | 11/2011 | Kuatto-Koivula et al. | |
| 2012/0053986 A1 | 3/2012 | Cardno et al. | |
| 2012/0170902 A1 | 7/2012 | Zhu et al. | |
| 2012/0179742 A1 | 7/2012 | Acharya et al. | |
| 2013/0194430 A1* | 8/2013 | Worrill | H04N 7/181 348/159 |
| 2014/0173507 A1* | 6/2014 | Demeyere | G06T 11/60 715/789 |
| 2014/0232874 A1* | 8/2014 | Meyer | H04N 7/181 348/159 |
| 2014/0333776 A1* | 11/2014 | Dedeoglu | H04N 7/181 348/159 |

OTHER PUBLICATIONS

Buchin et al. "Adjacency-preserving spatial treemaps", Proceedings of the 12th international conference on Algorithms and data structures (WADS'11), pp. 159-170, Springer-Verlag, Berlin, Aug. 2011, Heidelber.

* cited by examiner

*FIG. 9*
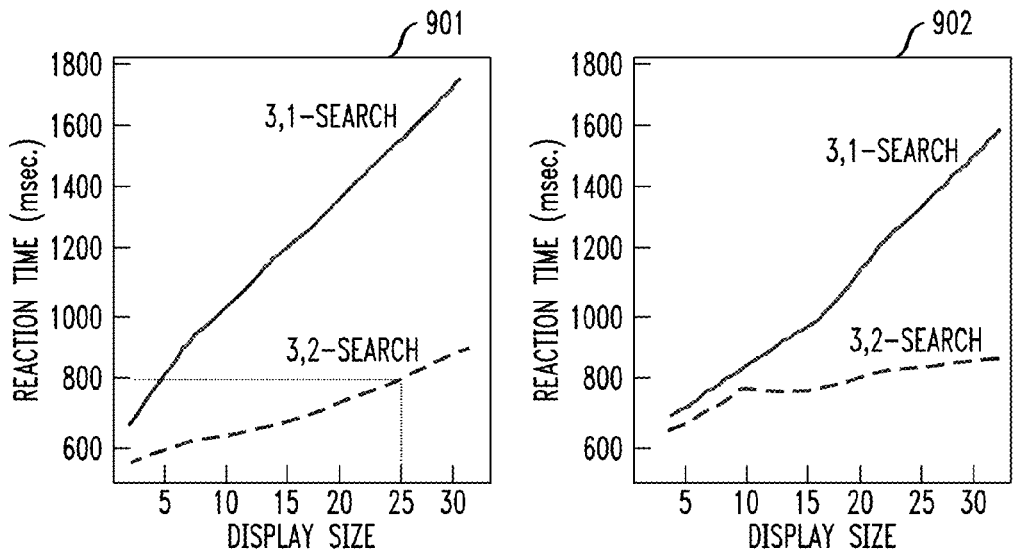
| SCENE COMPLEXITY | SWITING FREQUENCY |
|---|---|
| 1 | $a$ SECOND |
| 2 | $a * 2$ SECOND |
| 3 | $a * 3$ SECOND |
| 4 | $a * 4$ SECOND |
| 5 | $a * 5$ SECOND |
$5 < a < 20$ SECOND (USER INPUTS)
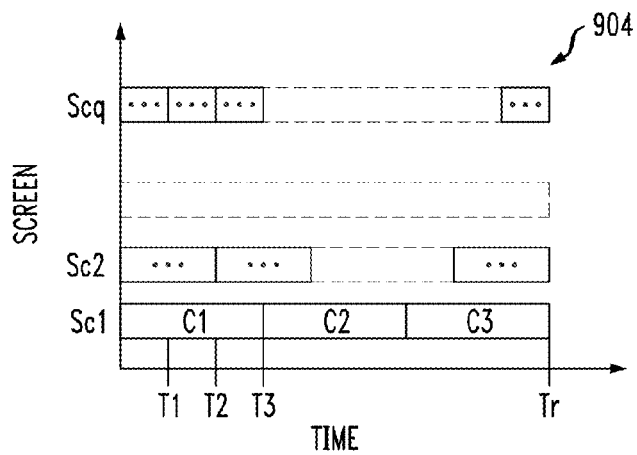

INSIGHT-DRIVEN AUGMENTED AUTO-COORDINATION OF MULTIPLE VIDEO STREAMS FOR CENTRALIZED PROCESSORS

BACKGROUND

The present disclosure relates generally to video processing, and more particularly, to coordinating the display of video feeds given limited processing power and screen availability.

Video cameras have been widely adopted for various functions including, for example, scattered asset management, order-maintaining for large buildings, and to promote service request response.

In some implementations, multiple video streams need to be simultaneously connected with a centralized control system. The centralized control system includes processors to view or analyze video streams, for example, to detect anomalous or unusual activities, events, and conditions. One or more processors are typically needed to process images or video streams from different monitoring devices within a limited time.

While monitoring installations, including cameras, produce many video streams, the installations have been placed in contexts with limited capabilities for monitoring the video feeds. The streams output by cameras are implemented in order to detect the occurrence of certain conditions/events. The detection of these conditions/events can be difficult due to, for example, the generally spatially heterogeneous distribution of conditions/events.

The images captured by the cameras are often busy and difficult to be simplified by image processing algorithms. It can be difficult for processors to look at changing images from scene to scene and identify conditions/events of interests.

BRIEF SUMMARY

According to an embodiment of the present disclosure, a method of providing video feeds from a plurality of cameras to a plurality of screens includes determining a plurality of constraints on a centralized processor processing the video feeds, determining a camera semantic classification for each of the plurality of cameras, determining a plurality of historical events captured by each of the plurality of cameras, and providing at least one video feed from the plurality of cameras to at least one of the screens according to the plurality of constraints on the centralized processors, the camera semantic classification and the historical events.

According to an embodiment of the present disclosure, methods can be embodied in computer program product, the computer program product comprising a computer readable storage medium having computer readable program code embodied therewith, the computer readable program code comprising computer readable program code configured to perform method steps thereof.

According to an embodiment of the present disclosure, a system providing video feeds from a plurality of cameras to a plurality of screens includes a processor basic unit determination module determining a plurality of constraints on a centralized processor processing the video feeds, a camera parameterization module determining a camera semantic classification for each of the plurality of cameras and determining a plurality of historical events captured by each of the plurality of cameras, and an event camera linkages module providing at least one video feed to at least one of the screens according to the plurality of constraints on the centralized processor, the camera semantic classifications and the historical events.

BRIEF DESCRIPTION OF THE SEVERAL VIEWS OF THE DRAWINGS

Preferred embodiments of the present disclosure will be described below in more detail, with reference to the accompanying drawings:

FIG. 9 is an illustration of a camera switch frequency parameterization according to an embodiment of the present disclosure.

DETAILED DESCRIPTION

Embodiments of the present disclosure relate to video processing, wherein integrated knowledge and data can be used to coordinate the display of video feeds given limited processing power and screen availability. For example, a method can be implemented to automatically coordinate the processing and display of video feeds received from different cameras by a centralized processor(s) based on processor constraints, camera semantic classification, historical events, etc.

Figure 1:
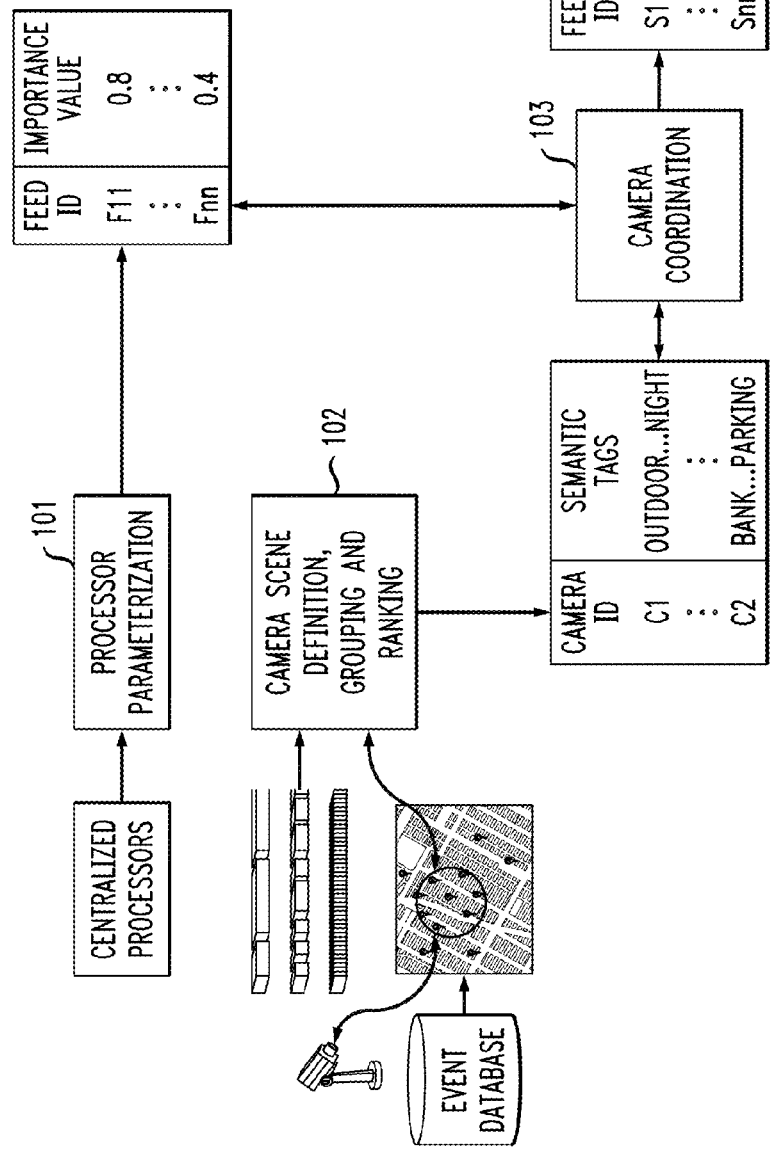
FIG. 1 is an illustration of a planning method according to an embodiment of the present disclosure.

According to an exemplary embodiment of the present disclosure, a system integrating knowledge and data (see FIG. 1, 100) includes modules for processor parameterization 101, camera parameterization 102, and camera-processing unit matching 103.

Figure 2:
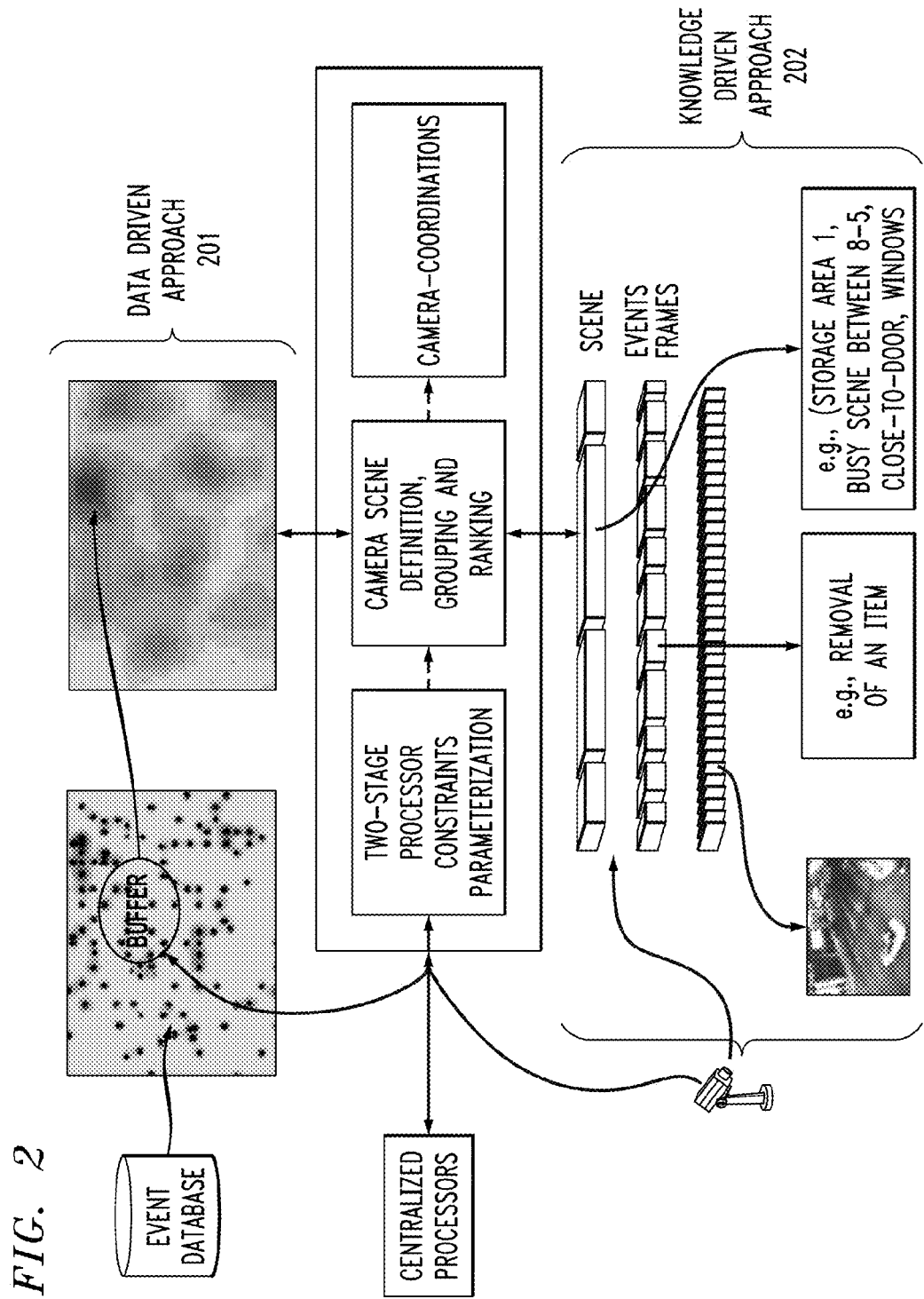
FIG. 2 is an illustration of a planning method according to an embodiment of the present disclosure.

As shown in FIG. 2, the system combines a data driven approach 201 in which the occurrence of events in one or more scenes captured by one or more cameras can be calculated and the cameras can be ranked based on a level of events and a knowledge driven approach 202 in which particularly camera feeds can be selected for display based on a knowledge of risk.

Figure 3:
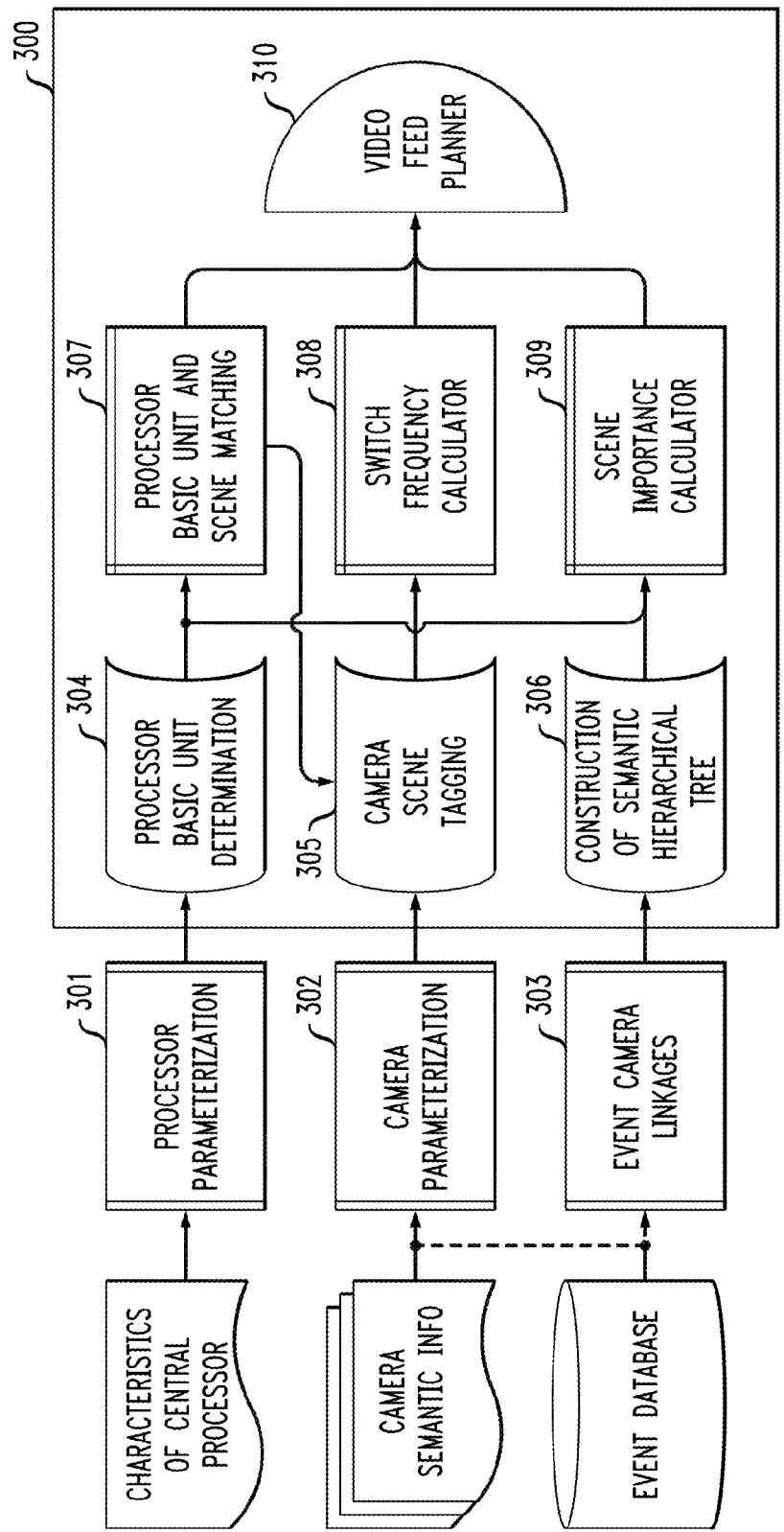
FIG. 3 is an illustration of a planning system according to an embodiment of the present disclosure.

Referring to FIG. 3, a video device 300 can take inputs from each of a processor parameterization component 301, a camera parameterization component 302, and event camera linkages 303. These inputs can be used to determine processor basic units at 304, camera scene tagging at 305, and construct a semantic hierarchical tree at 306.

Figure 4:
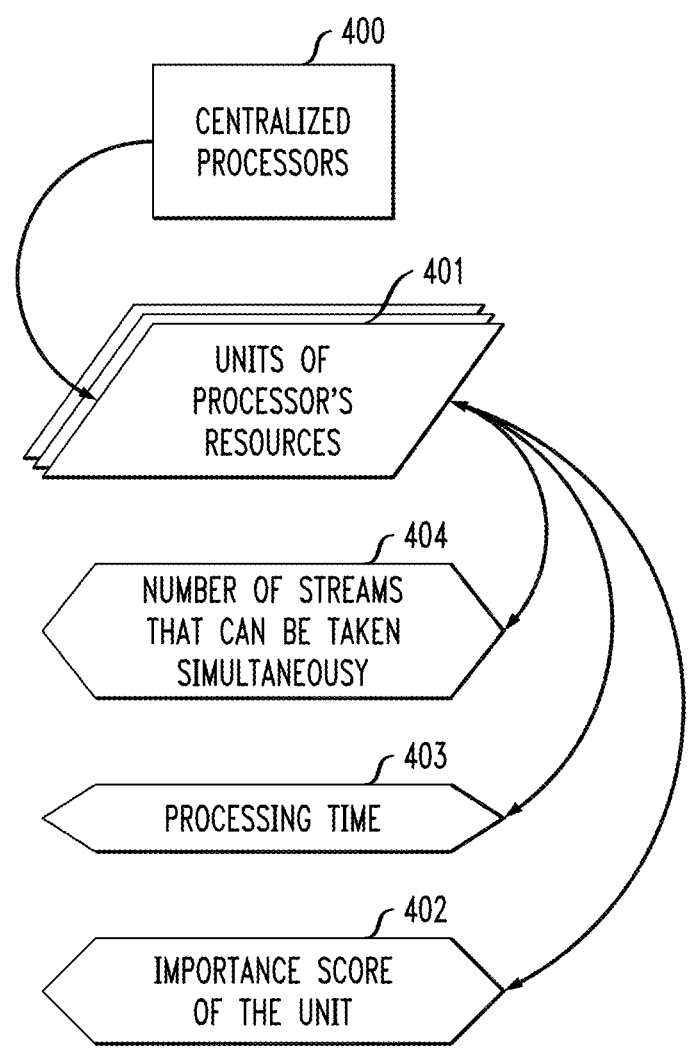
FIG. 4 is an illustration of a processor parameterization according to an embodiment of the present disclosure.

According to an exemplary embodiment of the present disclosure, the processor parameterization component 301 can perform a processor parameterization of the centralized processor(s) 400 (see FIG. 4). The processor parameterization can be a two-stage processor parameterization including (1) a parameterization of a processor's constraints based on user preferences and (2) the organization of the processor's constraints by a processing basic unit 401. The two-stage processor parameterization can describe each basic unit 401 of the processor by its importance (402), processing time (403), processing capability (404), etc.

According to an exemplary embodiment of the present disclosure and a processor basic unit and scene matching module 307 of FIG. 3 takes an output of the processor parameterization component (see 301) as an input, and can view the centralized processor as a system. The centralized processor can contain n number of basic processing units. A processing unit that can process more than one stream simultaneously can be further broken into processing components. According to an exemplary embodiment of the present disclosure, the processing components and their processing resource requirements are identical from one processing component to the next within a processing unit. Further, in one embodiment, each processing component in each processing unit processes one video stream at a time. Each processing component requires a minimum time to process a video stream.

In one embodiment, the basic processing units are different from one another in terms of processing capabilities. An importance ranking can be determined for a processing unit to represent the processing capabilities thereof.

In an exemplary implementation of processor parameterization, a video wall system (e.g., an installation of one or more displays) includes one or more processors with n number of basic processing units, wherein each processing unit corresponds to a certain region or screen of the video wall. Herein, the term screen references to a region of the video wall system, such that, for example, a single display can be organized to include a plurality of screens.

Figure 5:
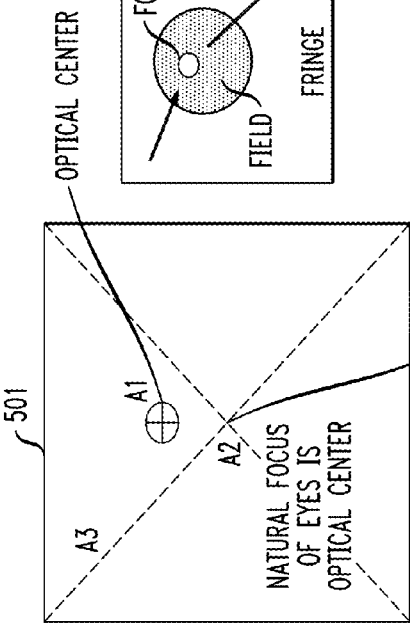
FIG. 5 is an illustration of a video wall parameterization according to an embodiment of the present disclosure.

In one embodiment, each screen displays one video stream at a time, and thus can be considered to be associated with a processing unit of the centralized processor. Depending on the scene complexity, each video stream may need to be displayed for a minimum time (e.g., several seconds) in order to provide an operator sufficient time to view the displayed scene. Further, the different regions of the video wall can have different cognitive importance from the point of view of the operator. FIG. 5 illustrates an exemplary method for determining importance ranking of the screens/processing units based on cognitive behaviors of an operator.

In an exemplary implementation of processor parameterization component (301), a processing system includes m number of processing routines and each routine can extract certain features from one or more video sources. Each routine runs within a different computer program. Each computer program can process one video stream at a time. Depending on a computational complexity, each routine needs a certain amount of video (e.g., several seconds of video) for image capturing and preprocessing. The different features that are extracted by the routines can have different levels of importance, herein after referred to as an importance score. The importance score of a camera can be used to match a scene captured by the cameras to a processor basic unit and scene matching module at 307 having its own importance ranking. Recall that the processor basic unit and scene matching module at 307 is associated with the certain region of the video wall. For example, in the field of rail management, the identification of surface settlement is more important than the wheel wear. Therefore, a scene including a surface can be displayed in a region of the video wall that is associated with higher value scenes (e.g., higher importance scores) and may be more readily viewed by the operator. For example, as illustrated in FIG. 5, a scene having a high importance score can be displayed nearer to an optical center of the video wall (see 501) based on a viewing convenience determination (see for example, 502).

According to an exemplary embodiment of the present disclosure and a camera parameterization 302 of FIG. 3, camera scene definition, grouping and ranking includes the integration of data from multiple sources including a subjectively defined semantic scene to add semantic tags to describe a camera's expected scenes (e.g., bank, indoor) at 305. Further, hierarchical trees can be developed to organize the semantic tags. For example, the semantic tags describe different levels of classification of scenes. These semantic tags can be organized by taxonomic scheme of the scenes. The hierarchical tree can be manually developed based on such organizations. Similarities between the semantic tags can be determined at the same level of each hierarchical tree. Cameras can be grouped based on the expected scenes. The integrated data, hierarchical trees, similarities between semantic tags, and groupings of cameras form a definition that can be based on a video classification or user inputs.

Figure 6:
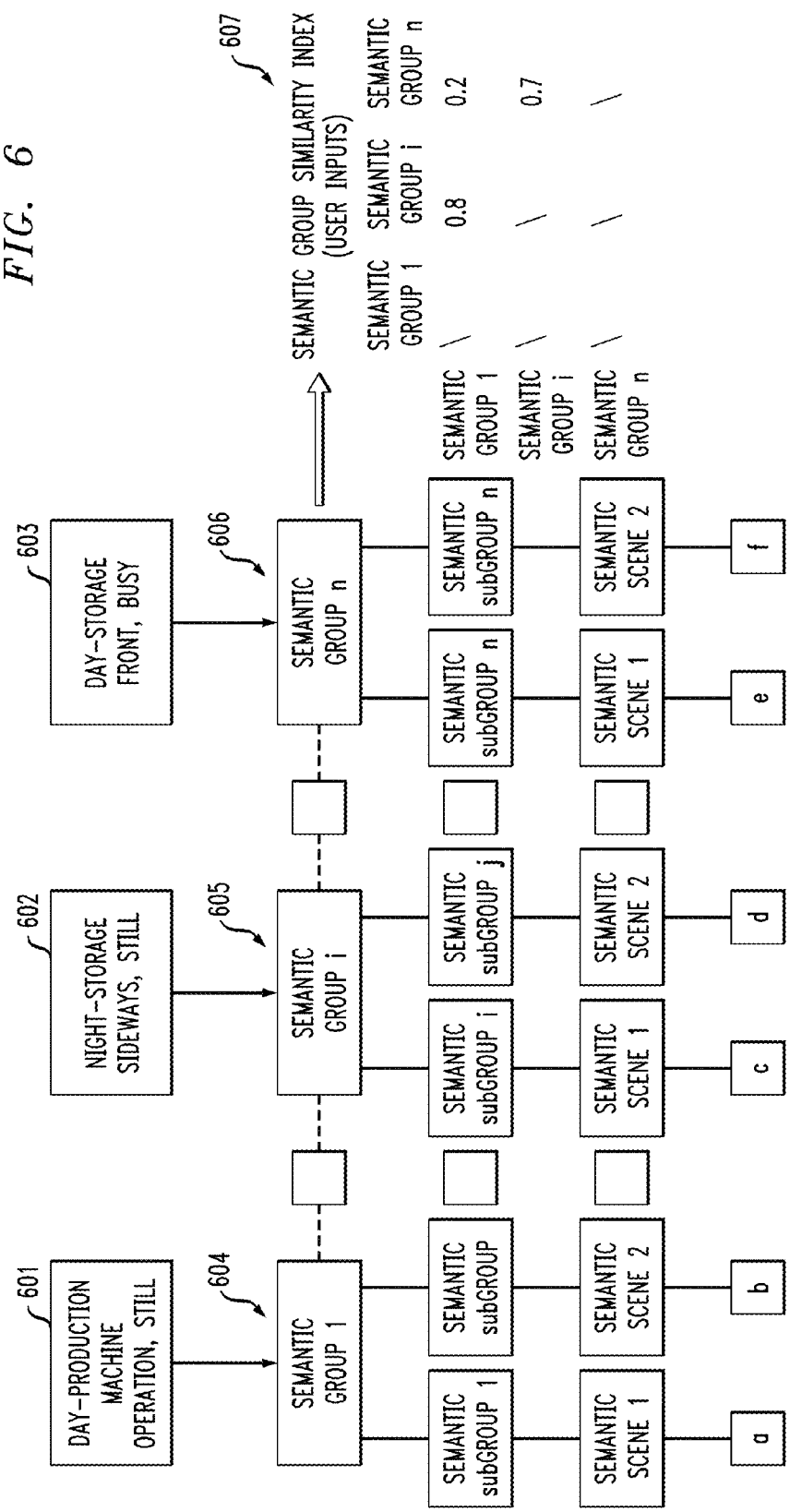
FIG. 6 is an illustration of a camera scene parameterization according to an embodiment of the present disclosure.

Referring to FIG. 6, multiple image stream sources corresponding to respective subjectively defined semantic scenes are input. In an exemplary context of a manufacturing plant, these scenes can include a still production facility monitored by machine during daytime hours 601 and a storage facility during nighttime hours (e.g., during a still condition) 602 and daytime hours (e.g., during a busy condition) 603. Other scenes can include the production facility monitored by a human during daytime hours, a maintenance area monitored by a human, etc. Corresponding hierarchical trees 604, 605 and 606 organize semantic tags. Similarities between the semantic tags are determined at the same level of each hierarchical tree and can be organized as a table 607. Within the table, cameras can be grouped based on the expected scenes. The video device 300 can sequentially display scenes from different cameras of a group according to a switch frequency, determined by the switch frequency calculator 308.

The switch frequency calculator 308 arranges scene display frequencies based on parameters including reaction time and scene complexity. The reaction time of an operator can be affected by the screen size, the number of features displayed, the number of distractors, etc. As shown FIG. 9, graphs 901 and 902 show results for experiments carried out to determine the reaction times of different operators for different display (screen) sizes given different numbers of features and different number of distractors. More particularly, in graph 901, the operator needs 800 milliseconds to identify 2 features with 3 distractors (a 3,2-search) with a 25 inch screen.

In a real world situation, the number of features and distractors can be difficult to determine. Scene complexity can be used to approximate the possible occurrences of features and distractors. The ranking of the scene complexity for each scene can be provided to the operator. The switch frequency of each scene is the reaction time multiplied by scene complexity. Using the switch frequency, the time-table for controlling the display of each camera group can be generated.

According to an exemplary embodiment of the present disclosure, camera-processing unit matching includes ranking cameras based the parameterized screen configurations and event risks (different from ranking cameras based on events only), and matching camera rankings of camera groups to basic processing units.

In an exemplary method of camera scene and screen integration matching screens to semantic scenes, a number of basic processing units (N) can be determined based on an importance score. The importance score can be based on any suitable metric, including for example, the average number of events detected by camera. The importance score can be input by a user and/or generated by a subject matter expert. A number of levels (M) of semantic groups can be determined. Semantic groups can be filtered based on temporal (e.g., a time-window during which there is no display, such as outside of business hours) or other user defined criteria (e.g., operation time). Semantic groups can be merged. The merging can be performed as follows:

for i in range (1, M):
  if number of semantic groups in level i>N:
    while number of semantic groups in level i>N:
      -> merge two most similar semantic groups
  elseif number semantic group in level i=N:
    -> output=i
  elseif i=M and number of semantic groups in level i<N:
    while number of semantic groups in level i<N
      -> regroup screen to N−1 group, N=N−1

It should be understood that the merging method above is merely exemplary and that other merging methods can be implemented.

Figure 7:
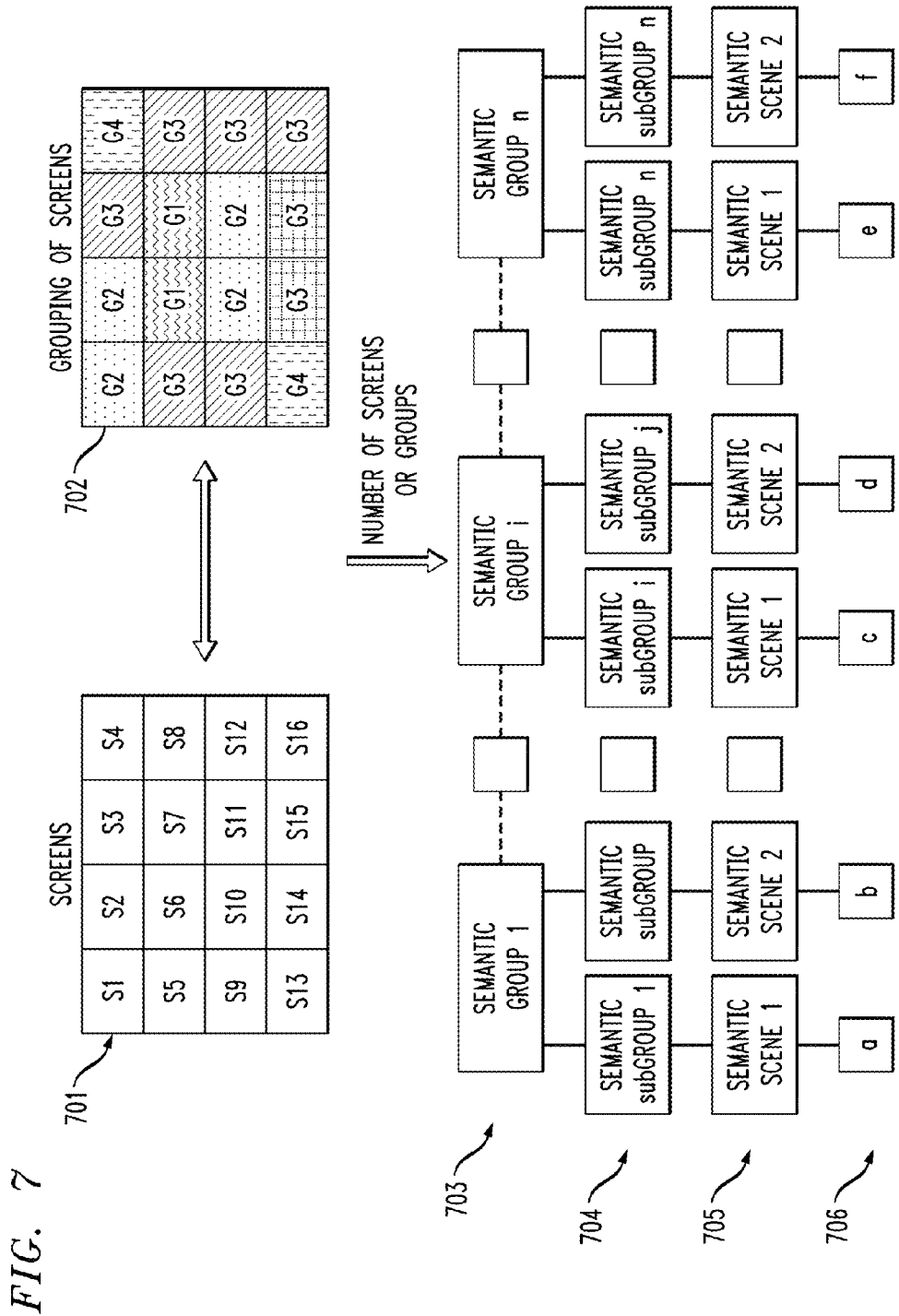
FIG. 7 is an illustration of a camera scene and screen integration according to an embodiment of the present disclosure.

As shown in FIG. 7, a set of screens S1-S16 (701) to be displayed on a video wall comprising one or more displays can be grouped (702). For example, Group G2 includes screens S1, S2, S10 and S11. The grouping can be determined according to a hierarchical structure (703) in which semantic sub-groups (e.g., 704) merge semantic scenes (705). In the hierarchical structure (703), the semantic scenes (705) are associated with one or more cameras a-f (706) and the semantic scenes (705) are grouped into the semantic subgroups (705) and, at a higher level, semantic groups (e.g., 1, i, n).

Figure 8:
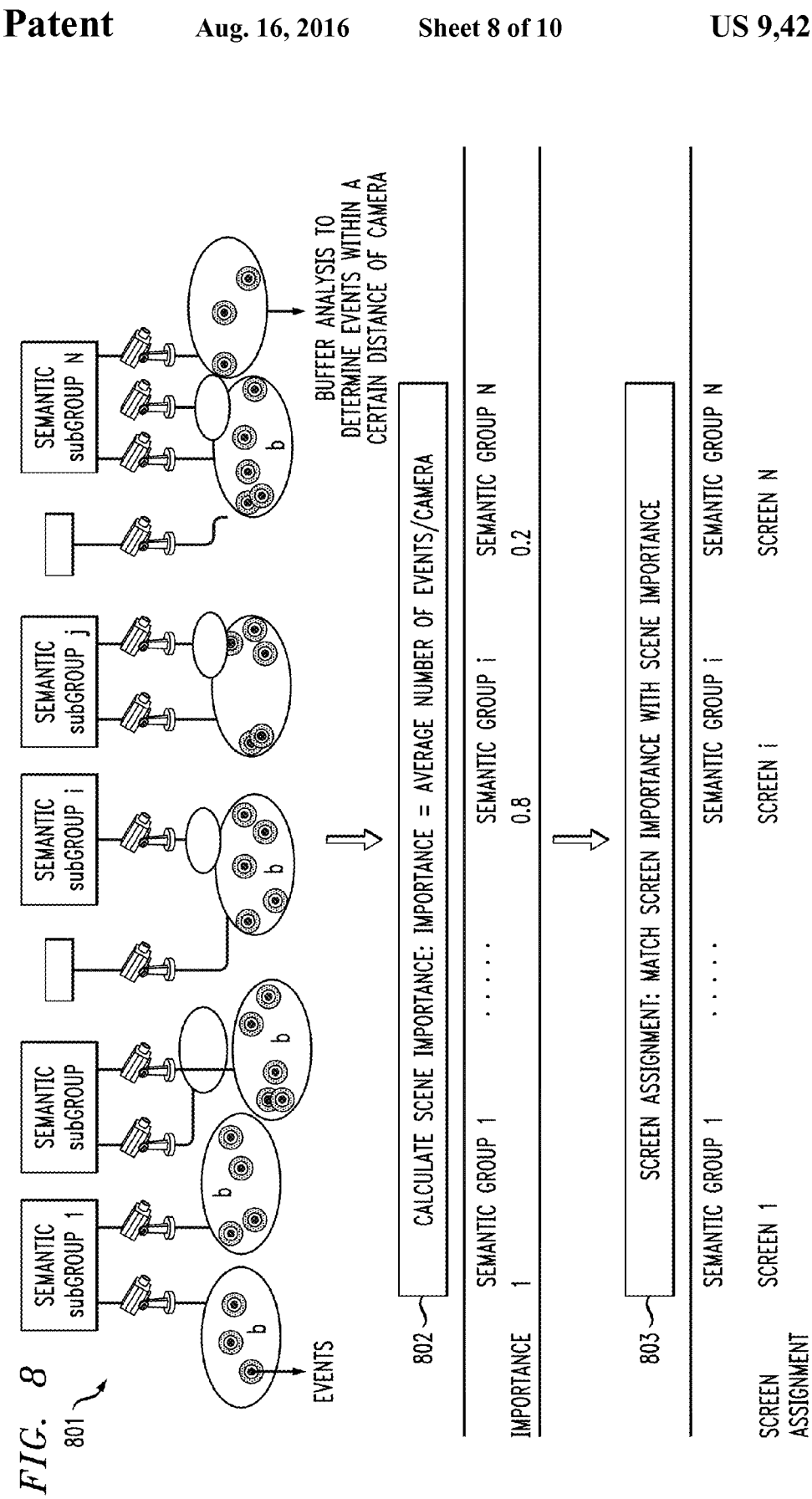
FIG. 8 is an illustration of a method for determining scene importance according to an embodiment of the present disclosure.

Referring to a scene importance calculator module 309 of FIG. 3, the integration of semantic groups (from the semantic hierarchical tree 306) and events includes the determination of an importance score of the scene. As shown in FIG. 8, given a set of cameras associated with different semantic groups (801, see also the event camera linkages 303, FIG. 3), an importance score of each scene can be determined according to an average number of events detected per cameras (802). The event camera linkages 303 are the spatial relationship between events and cameras. A typical relationship is "Within," e.g., assuming that events within a certain distance of a camera are likely to be detected by an operator. A buffer analysis can be used to determine the number of events that can be detected by a particular camera. Based on the event camera linkages, the average number of events detected per camera can be determined. A screen assignment can be performed according to the matching of screen importance ranking to scene importance score (803).

In FIG. 9, a camera switch frequency parameterization is illustrated at 901. Also shown are a user's reaction time for a given display size at 902 and 903. Finally, an exemplary screen-camera schedule is shown at 904.

In view of the foregoing, consider an exemplary case of a video wall comprising 9 screens each displaying a view of one of 5 scenes monitored by 100 cameras. Each of the screens can ranked according to an importance ranking (e.g., based on viewing convenience) (see FIG. 6). Each of the scenes can be ranked according to an importance score. Subsequently the scenes can be grouped (e.g., into respective display groups) to be displayed in the screens of the video wall (e.g., based on the viewing convenience) (see FIG. 8). That is, scenes captured by the cameras can be displayed on corresponding screen(s) with a determined switch frequency.

According to an exemplary embodiment of the present disclosure, integrated knowledge and data can be used to coordinate the display of video feeds given limited processing power and screen availability.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a system (see for example, FIG. 3, 300) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that matches scenes to basic processor units (see for example, FIG. 3: 307), a second module that determines a switch frequency (see for example, FIG. 3: 308); a third module that calculates an importance of a scene (see for example, FIG. 3: 309); and a fourth module that coordinates the display of video feeds in different regions of a video wall (see for example, FIG. 3: 310). Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 10:
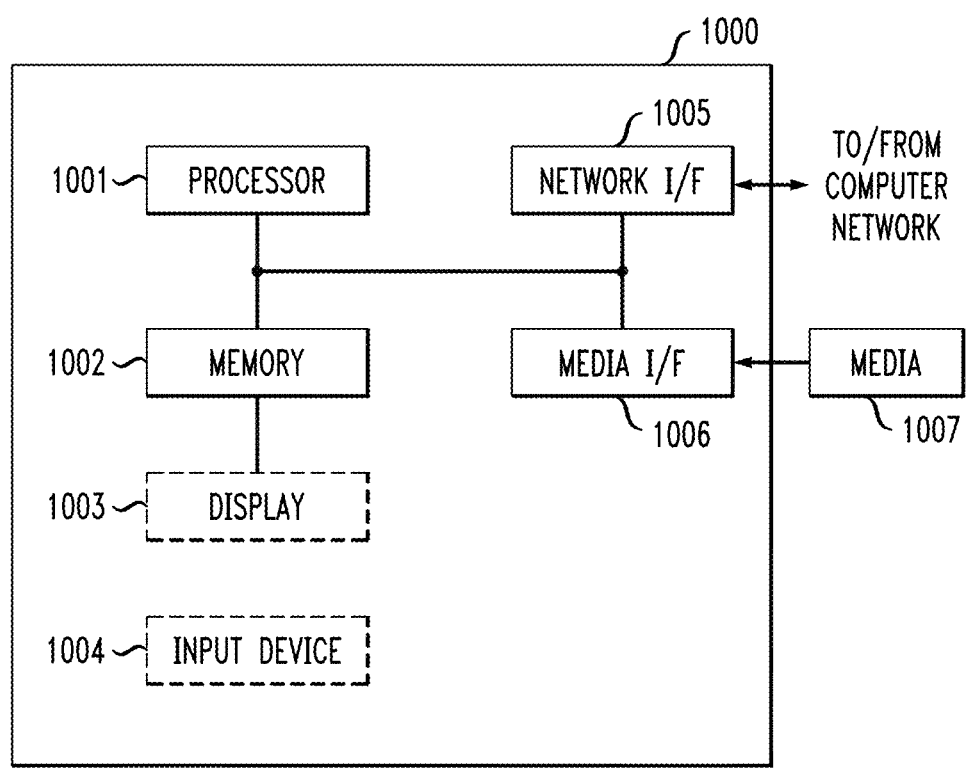
FIG. 10 is a block diagram depicting an exemplary computer system for determining a kernel according to an embodiment of the present disclosure.

For example, FIG. 10 is a block diagram depicting an exemplary computer system for coordinate the display of video feeds given limited processing power and screen availability according to an embodiment of the present disclosure. The computer system shown in FIG. 10 includes a processor 1001, memory 1002, display 1003 (e.g., video wall), input device 1004 (e.g., keyboard), a network interface (I/F) 1005, a media IF 1006, and media 1007, such as a signal source, e.g., camera, Hard Drive (HD), external memory device, etc.

In different applications, some of the components shown in FIG. 10 can be omitted. The whole system shown in FIG. 10 is controlled by computer readable instructions, which are generally stored in the media 1007. The software can be downloaded from a network (not shown in the figures), stored in the media 1007. Alternatively, a software downloaded from a network can be loaded into the memory 1002 and executed by the processor 1001 so as to complete the function determined by the software.

The processor 1001 may be configured to perform one or more methodologies described in the present disclosure, illustrative embodiments of which are shown in the above figures and described herein. Embodiments of the present disclosure can be implemented as a routine that is stored in memory 1002 and executed by the processor 1001 to process the signal from the media 1007. As such, the computer system is a general-purpose computer system that becomes a specific purpose computer system when executing the routine of the present disclosure.

Although the computer system described in FIG. 10 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method of providing video feeds from a plurality of cameras to a plurality of screens comprising:

determining a plurality of constraints on a centralized processor processing the video feeds;

determining a camera semantic classification for each of the plurality of cameras by assigning a plurality of semantic tags to describe a plurality of expected scenes of the plurality of cameras;

determining a plurality of historical events captured by each of the plurality of cameras;

providing at least one video feed from the plurality of cameras to at least one of the screens according to the plurality of constraints on the centralized processor, the camera semantic classifications and the historical events, generating a plurality of camera groups according to the plurality of semantic tags; and assigning an importance score to each of the plurality of camera groups, wherein the importance scores are determined based on an average number of events detected per camera for each of the plurality of camera groups and a parameterization of a configuration of the plurality of screens and an event risk of each of the plurality of camera groups.

2. The method of claim 1, further comprising determining the importance score for each of the plurality of cameras.

3. The method of claim 2, wherein the importance score is determined according to historic data of event capture.

4. The method of claim 1, further comprising parameterizing the plurality of constraints according to a preference.

5. The method of claim 4, wherein parameterizing the plurality of constraints further comprises organizing the plurality of constraints by resource unit, wherein the centralized processor comprises a plurality of resource units, and wherein each of the plurality of resource units is associated with an importance ranking.

6. The method of claim 5, wherein the organizing includes an assignment one or more of the plurality of cameras to each of the resource units of the centralized processor according to importance scores assigned to the plurality of cameras and the importance rankings of the resource units, wherein each of the centralized processors is associated with a respective one of the plurality screens.

7. The method of claim 1, further comprising generating a hierarchical tree organizing the plurality of semantic tags.

8. The method of claim 1, wherein providing the at least one video feed to the at least one of the screens comprises generating an event camera linkage, wherein the event camera linkage is a spatial relationship between an event and a camera of the plurality of cameras.

9. A computer program product for providing video feeds from a plurality of cameras to a plurality of screens, the computer program product comprising:
a non-transitory computer readable storage medium storing the computer program product and having computer readable program code embodied therewith, the computer readable program code comprising:
computer readable program code configured to determine a plurality of constraints on a centralized processor processing the video feeds;
computer readable program code configured to determine a camera semantic classification for each of the plurality of cameras;
computer readable program code configured to assign a plurality of semantic tags to describe a plurality of expected scenes of the plurality of cameras;
computer readable program code configured to determine a plurality of historical events captured by each of the plurality of cameras;
computer readable program code configured to provide at least one video feed from the plurality of cameras to at least one of the screens according to the plurality of constraints on the centralized processor, the camera semantic classifications and the historical events;
computer readable program code configured to generate a plurality of camera groups according to the plurality of semantic tags; and
computer readable program code configured to assign an importance score to each of the plurality of camera groups, wherein the importance scores are determined based on an average number of events detected per camera for each of the plurality of camera groups,
wherein the importance scores are based on a parameterization of a configuration of the plurality of screens and an event risk of each of the plurality of camera groups.

10. The computer program product of claim 9, further comprising computer readable program code configured to determine the importance score for each of the plurality of cameras.

11. The computer program product of claim 9, further comprising computer readable program code configured to determine parameterize the plurality of constraints according to a preference.

12. The computer program product of claim 11, wherein parameterizing the plurality of constraints further comprises organizing the plurality of constraints by resource unit, wherein the centralized processor comprises a plurality of resource units, and wherein each of the plurality of resource units is associated with an importance ranking.

13. The computer program product of claim 12, wherein the organizing includes an assignment one or more of the plurality of cameras to each of the resource units of the centralized processor according to importance scores assigned to the plurality of cameras and the importance rankings of the resource units, wherein each of the centralized processors is associated with a respective one of the plurality screens.

14. The method of claim 9, further comprising computer readable program code configured to generate a hierarchical tree organizing the plurality of semantic tags.

15. The method of claim 9, wherein providing the at least one video feed to the at least one of the screens comprises generating an event camera linkage, wherein the event camera linkage is a spatial relationship between an event and a camera of the plurality of cameras.

16. A system providing video feeds from a plurality of cameras to a plurality of screens comprising:
a processor basic unit determination circuit determining a plurality of constraints on a centralized processor processing the video feeds;
a camera parameterization circuit determining a camera semantic classification for each of the plurality of cameras by assigning a plurality of semantic tags to describe a plurality of expected scenes of the plurality of cameras and determining a plurality of historical events captured by each of the plurality of cameras;
an event camera linkages circuit providing at least one video feed to at least one of the screens according to the plurality of constraints on the centralized processor, the camera semantic classifications and the historical events,
generating a plurality of camera groups according to the plurality of semantic tags; and
assigning an importance score to each of the plurality of camera groups, the importance scores being determined based on an average number of events detected per camera for each of the plurality of camera groups and a parameterization of a configuration of the plurality of screens and an event risk of each of the plurality of camera groups,
wherein the centralized processor comprises a plurality of processing units, each of the processing units associated with a respective one of the plurality of screens.

* * * * *